US011947584B1

(12) United States Patent
Roy et al.

(10) Patent No.: US 11,947,584 B1
(45) Date of Patent: Apr. 2, 2024

(54) SYSTEM AND METHOD FOR SEARCHING AND PLAYING A PREDETERMINED START AND END TIME OF A CLIP WITHIN A LARGER AUDIO OR VIDEO FILE

(71) Applicant: PODCRUNCH INC., Saint-Hubert (CA)

(72) Inventors: Christian Roy, Montreal (CA); Daniel Robichaud, Outremont (CA); Dominic Gignac, Whitby (CA); Benjamin Comeau, Montreal (CA); Mathieu Rene, Montreal (CA)

(73) Assignee: PODCRUNCH INC., Saint-Hubert (CA)

( * ) Notice: Subject to any disclaimer, the term of this patent is extended or adjusted under 35 U.S.C. 154(b) by 0 days.

(21) Appl. No.: 18/554,739

(22) PCT Filed: Apr. 14, 2022

(86) PCT No.: PCT/CA2022/050580
§ 371 (c)(1),
(2) Date: Oct. 10, 2023

(87) PCT Pub. No.: WO2022/217361
PCT Pub. Date: Oct. 20, 2022

Related U.S. Application Data

(60) Provisional application No. 63/201,190, filed on Apr. 16, 2021.

(51) Int. Cl.
*G06F 16/41* (2019.01)
*G06F 16/435* (2019.01)
*H04L 67/06* (2022.01)

(52) U.S. Cl.
CPC ............ *G06F 16/41* (2019.01); *G06F 16/435* (2019.01); *H04L 67/06* (2013.01)

(58) Field of Classification Search
CPC .............................. G06F 16/41; G06F 16/435
USPC ......................................................... 707/747
See application file for complete search history.

(56) References Cited

U.S. PATENT DOCUMENTS

| | | | |
|---|---|---|---|
| 7,769,819 | B2 | 8/2010 | Lerman et al. |
| 10,318,579 | B2 | 6/2019 | Brenner et al. |
| 11,010,123 | B2 | 5/2021 | Asquith et al. |
| 2015/0039727 | A1 | 2/2015 | Jones et al. |
| 2015/0089019 | A1 | 3/2015 | Chou |
| 2019/0044862 | A1 | 2/2019 | Courtemanche |

(Continued)

FOREIGN PATENT DOCUMENTS

| | | |
|---|---|---|
| GB | 2549323 A | 6/2022 |
| WO | 2021080971 A1 | 4/2021 |

*Primary Examiner* — Kimberly L Wilson
(74) *Attorney, Agent, or Firm* — LAVERY, DE BILLY, LLP; Gonzalo Lavin

(57) ABSTRACT

System and method for creating clips of larger audio streams based on very accurate in point and out point and for searching for the clips. The system and method use byte signatures in MP3 or media files to accurately and efficiently find a specific cue point, such as for example, the beginning of a sentence in a podcast. The system and method are configured to search and locate a given clip even if that sequence moves inside the stream, such as for example, if the audio file adds additional content like advertisements or other audio sequence, the hash representation of the cue point can still be found with millisecond accuracy.

9 Claims, 3 Drawing Sheets

(56) References Cited

U.S. PATENT DOCUMENTS

2022/0020376 A1    1/2022  Garg et al.
2022/0109712 A1*   4/2022  Cain ................... H04L 65/762
2023/0031033 A1*   2/2023  Cain .................. G06F 16/1794

* cited by examiner

SYSTEM AND METHOD FOR SEARCHING AND PLAYING A PREDETERMINED START AND END TIME OF A CLIP WITHIN A LARGER AUDIO OR VIDEO FILE

CROSS-REFERENCE TO RELATED APPLICATIONS

This application is a National Entry Application of PCT application No. PCT/CA2022/050580 filed on Apr. 14, 2022 and published in English under PCT Article 21(2), which itself claims benefit of U.S. provisional application Ser. No. 63/201,190, filed on Apr. 16, 2021. All documents above are incorporated herein in their entirety by reference.

FIELD OF THE INVENTION

The present invention relates to a system and method for transmitting partial podcasts to user devices.

BACKGROUND OF THE INVENTION

Sending and receiving audio and video files using the Internet can be performed using various schemes, involving various types push or pull technologies. A particularly useful scheme is podcasting. Podcasting is a means of distributing audio and video files or multimedia files via the Internet that lets users subscribe to a number of files, also known as "feeds," and then hear or view the material at the time that they choose. Podcasting is distinct from other types of online media delivery because of its subscription model, rather than one-time delivery. A series of files are delivered to allow subscribers to get the information regularly. In order to use podcasting, a user selects appropriate distribution formats or data schemes (for example, Really Simple Syndication (RSS) or Atom syndication formats) on the user device (for example a personal computer, tablet computer, intelligent phone or the like). The user then connects the user device over the Internet to a designated website, identified by a URL, and then the software on the user device periodically checks for and downloads new content automatically.

Several issues arise, however, in relation to the uploading and downloading of podcasts. These issues include, for example, the increase in network traffic and use of storage space involved in the uploading and downloading of files. In addition, an issue may arise where a party who desires to download a podcast already owns one or more of parts of podcast and, therefore, would likely prefer not to download and, more likely prefer not to be charged for downloading, parts of the podcast that the user already owns.

Another issue concerns the bit rate of a podcast, which refers to the number of bits that are conveyed or processed per second. The bit rate defines the podcast quality. Higher bit rates convey more data, improve the quality, but result in larger file sizes. Conversely, lower bit rates convey less data, decrease the quality and result in smaller file sizes. Variable bit rates are often used over constant bit rates because the former produces a better quality-to-space ratio. Variable bit rates can create problems when seek times at precise points of a file.

When assembling and streaming a clip of a podcast upstream, the streamer may want to remove and/or change and/or add advertisements or publicity portions of a media file before these are streamed to the user device. However, these changes modify cue points in a file.

A known technique for searching or finding a specific cue point in a media file involves using a matching waveform process. However, this process is very slow and only results in about 70%-80% accuracy. The accuracy of the matching waveform technique may be affected by the bit rate, which is reduced when using variable bit rate. The matching waveform process searches for parts of an audio file and uses an audio fingerprint. A fingerprint is a condensed digital summary that is deterministically generated from an audio signal, and that can be used to identify an audio sample or quickly locate similar items in an audio database or library.

Currently, two methods are being used in the industry to allow users to listen to podcast clips (sample of audio within a large file, limited with cue points in and out): clips of podcasts are either segmented in advance and stored on servers before being accessed by user devices, which may be illegal from a copyright perspective. Or, a 'seek to' approach may be used in order to access to the clips, which basically streams the original audio file and simply seeks to a certain place in the file using timing (i.e. go to minute 13 of 50 minutes podcast and play).

The drawbacks of the prior art systems and methods is that these typically do not respect copyright laws around manipulation of original content, or take a lot of time to seek to and play, or are not accurate because of changes in cue points because of advertisement injection or other changes on the podcast episode timing.

There is therefore a need for an improved system and method to search and play the exact start and end time of a clip within a larger audio file that respects copyright laws by not storing portions of the audio or media file on an unauthorized non-transitory computer-readable medium.

U.S. Pat. No. 11,295,746 B2 (GARG) discloses a method including receiving podcast content, generating a transcript of at least a portion of the podcast content, and parsing the podcast content to (i) identify audio segments within the podcast content, (ii) determine classifications for the audio segments, (iii) identify audio segment offsets, and (iv) identify sentence offsets. This patent teaches that audio segments are identified using timestamps. This identification of audio segments is not very precise since an MP3 or MP4 format uses frames and those timestamps may change due to compression (Variable Bitrate—VBR). This also does not address the issue where if ads are integrated into the stream, the timestamp will no longer point to the exact audio cue.

U.S. Pat. No. 11,010,123 B2 (ASQUITH) discloses a computer system including a server to publish RSS feeds each including a unique ID for an associated audio file. Each audio file has an action pinned to a respective playback time window within the audio file. This patent stores information about start and stop of audio files and refers back to them using a unique ID. While the patent suggests using machine-learning to better identify the start and stop, this is only done to help the user move from clip to clip but it is not used to find a precise audio cue in the original file.

International patent application published under No. WO 2021/080971A1 (SANTER) discloses a system and method for creating and sharing clips of podcasts. The system enables creation of a clip from a podcast episode for personal reference and/or for sharing with others. This patent application discloses to store copies of an audio files on a service and refers back to them using a unique ID. As mentioned above, the storing of copies is problematic as this may infringe copyrights of third parties and does not refer back to the unmodified, original piece of audio content. This means the podcaster also does not receive views or analytics of his copied content.

U.S. Pat. No. 10,318,579 B2 (BRENNER) discloses methods and systems for inserting information into content playing via a playback device are described. This patent focuses on inserting new data or audio within an existing audio file. It uses a fingerprint concept based on hash values that only represents the waveform of the file. While this patent discloses a way to storing cue points, it is only about 70% accurate and also extremely slow.

U.S. Pat. No. 7,769,819 B2 (LERMAN) discloses browser-based clip manipulation methods and systems for rendering and editing a clip. This patent focuses on video editing.

SUMMARY OF THE INVENTION

According to the present invention, there is provided a computer system comprising a server configured to support partial requests for podcasting partial media files having headers that have accept-range bytes; a user device cooperating with the server for receiving the partial media files; wherein at the server, the computer system is configured to: download a partial media file obtained from an original media file to produce a pre-trimmed file having byte indexes including byte in and byte out; search the byte indexes in the pre-trimmed file having a hash in and a hash out; trim the pre-trimmed file by using said hash in and said hash out to produce a trimmed file; and store the trimmed file in a memory of the user device.

In embodiments, there is provided a method comprising: at a server, downloading a partial media file obtained from an original media file to produce a pre-trimmed file having byte indexes including byte in and byte out, said server being configured to support partial requests for podcasting partial media files having headers that have accept-range bytes; searching the byte indexes in the pre-trimmed file having a hash in and a hash out; trimming the pre-trimmed file by using said hash in and said hash out to produce a trimmed file; and storing the trimmed file in the cache or the memory of the user device.

In embodiments, there is provided a non-transitory computer-readable medium having computer-executable instructions for causing a server and a user device to perform steps comprising: at the server, downloading a partial media file obtained from an original media file to produce a pre-trimmed file having byte indexes including byte in and byte out, said server being configured to support partial requests for podcasting partial media files having headers that have accept-range bytes; searching the byte indexes in the pre-trimmed file having a hash in and a hash out; trimming the pre-trimmed file by using said hash in and said hash out to produce a trimmed file; and storing the trimmed file in the cache or the memory of the user device.

In embodiments, the original media file comprises an MP3 file or an MP4 file.

In embodiments, there is provided a method comprising: receiving an original MP3 file comprising MP3 frames, each frame having a frame header and a data block; processing the original MP3 file to produce a pre-trimmed file having byte indexes including byte in and byte out; trimming the pre-trimmed file by using a hash in and a hash out to produce a trimmed file; converting the trimmed file into a hash by using a hash function; and storing the hash in a database using a unique ID thereby creating a hash signature.

In embodiments, the above method further comprises: for each frame (11) of the MP3 file, iteratively comparing the first two bytes of the hash signature with the first two bytes of the data block until finding a frame match; if the frame match is found, computing a hash of the data block; comparing the hash signature, excluding the first two bytes of the hash signature, with a start of the computed hash of the data block until a signature match; if the signature match is found, returning a sum of the frames.

In embodiments, the hash function is a secure hash algorithm-256 (SHA-256).

In embodiments, the system and method create clips of larger audio streams based on very accurate in point and out point. The system and method leverage byte signatures in MP3 or MP4 files to accurately and efficiently find a specific cue point (for example, the beginning of a sentence in a podcast) even if that sequence moves inside the stream (if the audio file adds additional content like ads or other audio sequence, the hash representation of the cue point can still be found with millisecond accuracy).

In embodiments, there is provided a method to find the time position of a frame in a MP3 audio file using a hashed signature. The method works both with a complete and partial MP3 file. A partial file is managed by a download process and consists of a file that does not contain all the MP3 frames.

In embodiments, there is provided a method that uses the actual file signature at a certain MP3 frame which is not related to the audio itself but has a up to 100% accuracy and is extremely fast to search (near real-time).

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

As will be appreciated by persons skilled in the art upon reading the following disclosure, various aspects described herein may be embodied as a system, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
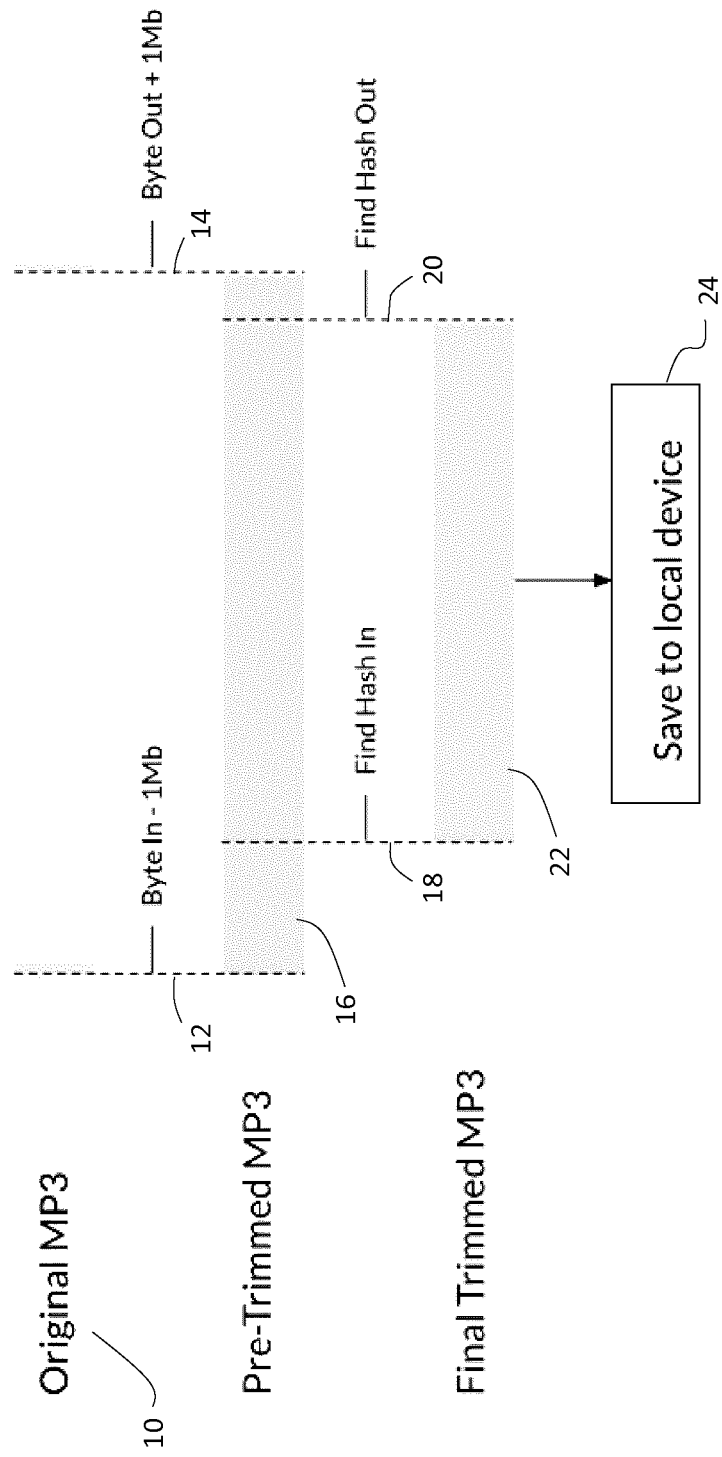
FIG. 1 is flowchart of a method for searching and storing a predetermined start and end time of a clip within a larger audio or media file, according to a preferred embodiment of the present invention.

Referring to FIG. 1, there is shown a flowchart of a method for searching and storing a predetermined start and end time of a clip within a larger audio file, according to a preferred embodiment of the present invention. In this example, the larger audio file is an original MP3 file 10. The audio file may be an MP3 or an MP4 file.

Figure 2:
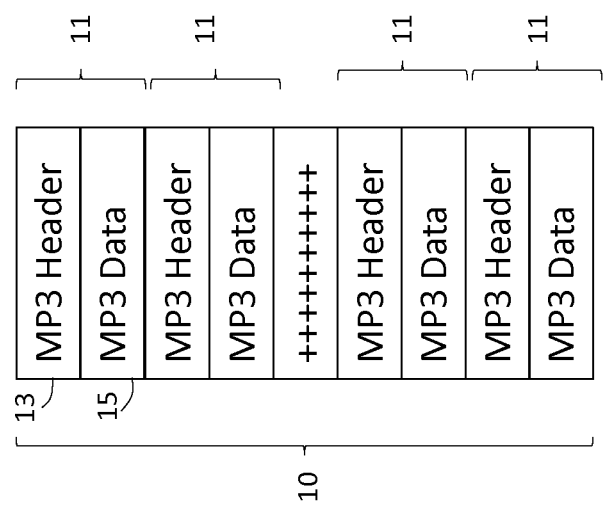
FIG. 2 is a schematic diagram of an MP3 file used in a system and method, according to a preferred embodiment of the present invention

Referring to FIG. 2, the MP3 file 10 is composed of a sequence of MP3 frames 11. An MP3 frame 11 contains an MP3 frame header 13 and a MP3 data block 15. The MP3 frame header 13 contains the MPEG version, the MPEG layer and the sample rate. The MPEG version is the MPEG standard used in encoding the MP3 frame 11. The MPEG layer is the MPEG layer of the MP3 frame 11. The sample rate is the sample rate of the MP3 frame 11. With this information (i. e. MPEG version, MPEG layer and sample rate) other values can be inferred, such as: i) bits per sample (based on the MPEG version specification; ii) sample count (based on the MPEG version and the MPEG layer specifications; and frame duration (calculated with the sample rate (Hz) and the sample count.

In a first step, the method starts by downloading a partial MP3 or media file if the server supports partial requests for podcasting partial media files having headers that have accept-range bytes on the user's device's memory or cache. Downloading partial files through HTTP request is something supported by a majority of servers that keeps downloads quick and efficient. For a range start, the method uses for example a byteIn−1e6 (equal to byte minus 1 Mb). For a range end, the method uses for example a byteOut+1e6 (equals to byte plus 1 Mb). The purpose of this first step is to get a bit more of the clip to perform the later hash signature search.

In a second step, the method finds byte indexes in 12 and out 14 for hash to produce a pre-trimmed MP3 file 16. This is a known process that allows identifying the starting point and ending point of a digital file. For example, if a file is 100 MB you can extract the data from Megabyte 5 to Megabyte 10 so that it will return a 5 MB file instead of the original 100 MB. This helps speed up the process of searching for Hash Signatures.

In a third step, the method trims the pre-trimmed MP3 file 16 by using these indexes (millisecond accuracy) to find the hash in 18 and out 20 to produce the final trimmed MP3 file 22. Trimming MP3 file not only creates the final playable clip, but is used to later store locally on the user's device's memory or cache and ultimately play file online or offline.

In a fourth step 24, the method stores the resulting trimmed MP3 file 22 to a user device 34.

Figure 3:
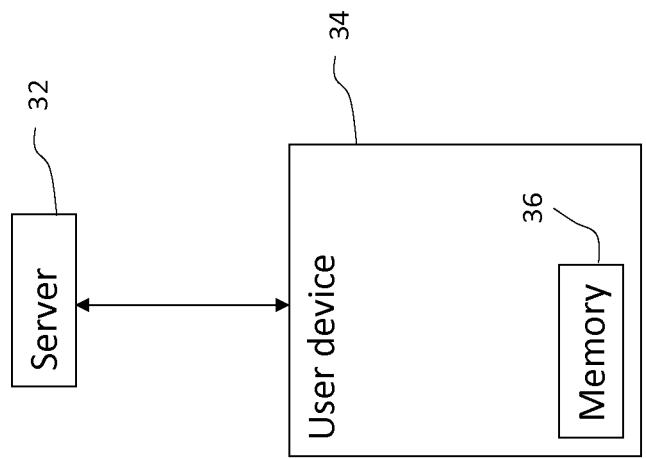
FIG. 3 is a block diagram of a system for searching and storing a predetermined start and end time of a clip within a larger audio or media file, according to a preferred embodiment of the present invention.

Referring to FIG. 3, there is shown a system 30 for searching and storing a predetermined start and end time of a clip within a larger audio or media file, according to a preferred embodiment of the present invention. The system includes a server 32 and a user device 34 with a memory 36 for saving or storing the trimmed MP3 file 22.

Finding a Frame

In embodiments, a method according to the present invention can find a frame with a time offset from the start, using the sum of the frames duration.

In embodiments, a method according to the present invention can also find a frame with a hash signature, and compute the time offset from the start of the file.

Frame Hash Signature

The hash signature of a frame is composed of two parts: i) the first two bytes of the data block 15 (using this will reduce the number of hash computes during a find-by-hash process); and ii) a SHA-256 hash of the data block 15. The 24 first characters of the HEX representation of this compounded hash can be used in the find-by-hash process.

As known by persons skilled in the art, a SHA-256 (Secure Hash Algorithm 256) is a cryptographic hash function that outputs a value that is 256 bits long. During hashing, data is encrypted and transformed into a secure format that is unreadable unless the recipient has a key.

In embodiments, instead of SHA-256, other SHAs (Secure Hash Algorithms) may be used to achieve the above functions and arrive at the same results.

Creating the Hash Signature

An initial process is run against the full MP3 file 10. Using timestamps for in and out, the associated frames (in and out) and their data are converted into a SHA-256 hash. This hash is stored in a database using a unique ID so it can be later retrieved and used to find that exact moment back into the original MP3 file 10. This process is done once to identify the frames, convert them to hash and then later used for finding the in and out points.

Find by Hash Process

To find a frame 11, using a hash signature, the method iterates over each frame 11 of the MP3 file 10. For each frame 11, the first two bytes of the hash signature are compared with the first two bytes of the data block 15. If they do not match, the iteration moves to the next frame 11. If they match, a SHA-256 hash of the data block 15 is computed. Then the method verifies if the hash signature, excluding the first two bytes, matches the start of the computed hash of the data block 15. When a match is found the iteration stops, and the sum of previous frames duration is returned.

Use Case Example

Figure 4:
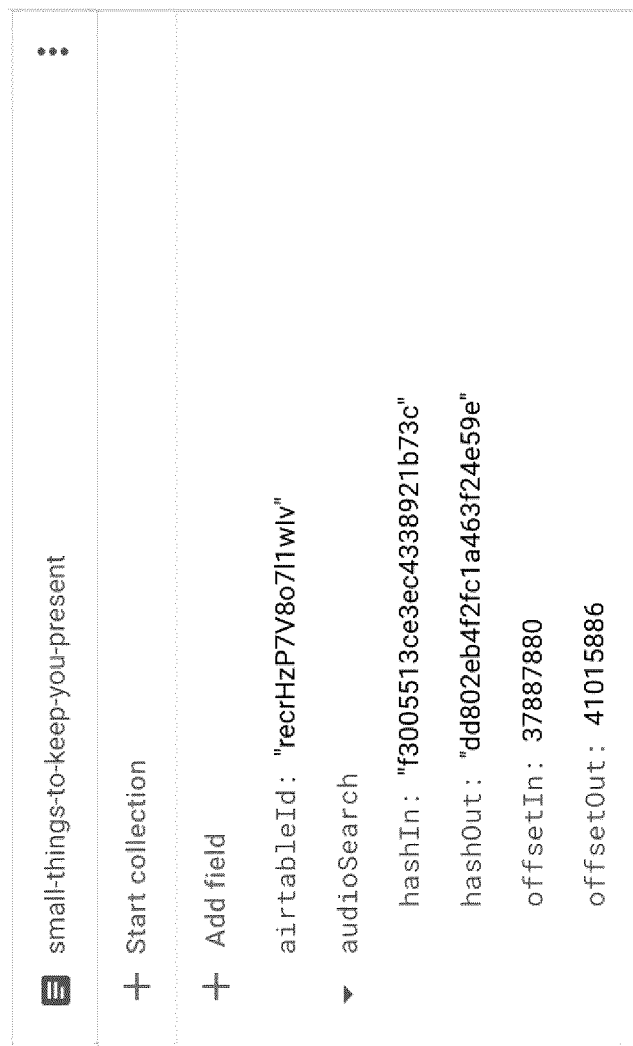
FIG. 4 is an example of a clip of a playlist of a podcast showing hash data, according to a preferred embodiment of the present invention.

Referring to FIG. 4, there is shown a first clip of a playlist of a podcast. The first clip is called "Small-things-to-keep-you-present".

A hash worker function has previously sought the starting and ending points (39:26.0 in and 42:41.5 out) making the clip 3 minutes and 16 seconds. By scanning the MP3 file, the hash worker function created two signatures based on the MP3 frames: HashIn=f3005513ce3ec4338921b73c and HashOut=dd802eb4f2fc1a463f24e59e. The hash worker function also identifies an offset so that when it goes back to fetch content, it does not need the whole file: OffsetIn=37887880 and OffsetOut=41015886.

Once a user clicks on the clip to listen to it, an application loads the streaming MP3 in memory and searches for the 2 Hash Signatures to extract the clip. This resulting clip is then passed over to the App Audio Player (Trac Player) and then plays the resulting clip with millisecond accuracy. A podcaster receives the view and the analytics, and the file is played without any alterations, making it legal from a copyright perspective.

The system and method according to the present invention are advantageous in their combination of searching audio or media files based on byte hash to find starting and ending points regardless of where they might be in the original audio stream. In other words, even if the audio (or media) start and end moves in the file, the hash indexes stay the same so we can find exactly where the audio segment (media segment) is located even if the audio sequence has been modified. For example, with an advertisement injection that would modify IN and OUT cue points based on time.

The system and method according to the present invention is advantageous in that it searches and plays the exact, or to a very high accuracy of about 99%, start and end times of a clip within a larger audio file that respects copyright laws by not storing portions of the audio or media file on an unauthorized transitory computer-readable medium.

Searching and identifying content such as a clip in a larger media file using a hash signature of the original file is very different and much more efficient than using timestamps as in known prior art methods. Also, known prior method do not identify precise audio cue in the original media file for searching purposes. The method uses the actual file signature at a certain MP3 frame which is not related to the audio itself but has a near 100% accuracy and is extremely fast to search (near real-time).

The scope of the claims should not be limited by the preferred embodiments set forth in the examples but should be given the broadest interpretation consistent with the description as a whole.

The invention claimed is:

1. A computer system comprising:
   a server configured to support partial requests for podcasting partial media files having headers that have accept-range bytes;
   a user device cooperating with the server for receiving the partial media files;
   wherein at the server, the computer system is configured to:
      download a partial media file obtained from an original media file to produce a pre-trimmed file having byte indexes including byte in and byte out;
      search the byte indexes in the pre-trimmed file having a hash in and a hash out;
      trim the pre-trimmed file by using said hash in and said hash out to produce a trimmed file; and
      store the trimmed file in a memory of the user device.

2. The system of claim 1, wherein the original media file comprises an MP3 file or an MP4 file.

3. A method comprising:
   at a server downloading a partial media file obtained from an original media file to produce a pre-trimmed file having byte indexes including byte in and byte out, said server being configured to support partial requests for podcasting partial media files having headers that have accept-range bytes;
   searching the byte indexes in the pre-trimmed file having a hash in and a hash out;
   trimming the pre-trimmed file by using said hash in and said hash out to produce a trimmed file; and
   storing the trimmed file in a cache or a memory of a user device.

4. The method of claim 3, wherein the original media file comprises an MP3 file or an MP4 file.

5. A non-transitory computer-readable medium having computer-executable instructions for causing a server to perform steps comprising:
   at the server, downloading a partial media file obtained from an original media file to produce a pre-trimmed file having byte indexes including byte in and byte out, said server being configured to support partial requests for podcasting partial media files having headers that have accept-range bytes;
   searching the byte indexes in the pre-trimmed file having a hash in and a hash out;
   trimming the pre-trimmed file by using said hash in and said hash out to produce a trimmed file; and
   storing the trimmed file in a cache or a memory of a user device.

6. The non-transitory computer-readable medium of claim 5, wherein the original media file comprises an MP3 file or an MP4 file.

7. A method comprising:
   receiving an original MP3 file comprising MP3 frames, each frame having a frame header and a data block;
   processing the original MP3 file to produce a pre-trimmed file having byte indexes including byte in and byte out;
   trimming the pre-trimmed file by using a hash in and a hash out to produce a trimmed file;
   converting the trimmed file into a hash by using a hash function; and
   storing the hash in a database using a unique ID thereby creating a hash signature.

8. The method of claim 7, further comprising:
   for each frame of the MP3 file, iteratively comparing the first two bytes of the hash signature with the first two bytes of the data block until finding a frame match;
   if the frame match is found, computing a hash of the data block;
   comparing the hash signature, excluding the first two bytes of the hash signature, with a start of the computed hash of the data block until a signature match;
   if the signature match is found, returning a sum of the frames.

9. The method of claim 7, wherein the hash function is a secure hash algorithm-256 (SHA-256).

* * * * *